US009459422B2

(12) United States Patent
Gimblet et al.

(10) Patent No.: US 9,459,422 B2
(45) Date of Patent: Oct. 4, 2016

(54) COUPLING SYSTEM FOR A FIBER OPTIC CABLE

(71) Applicant: Corning Optical Communications LLC, Hickory, NC (US)

(72) Inventors: Michael John Gimblet, Conover, NC (US); Julian Latelle Greenwood, III, Hickory, NC (US); Jason Clay Lail, Conover, NC (US); Eric John Mozdy, Horseheads, NY (US); David Alan Seddon, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 355 days.

(21) Appl. No.: 14/255,277

(22) Filed: Apr. 17, 2014

(65) Prior Publication Data

US 2016/0216468 A1    Jul. 28, 2016

Related U.S. Application Data

(60) Provisional application No. 61/840,641, filed on Jun. 28, 2013.

(51) Int. Cl.
| | |
|---|---|
| *G02B 6/44* | (2006.01) |
| *G02B 6/02* | (2006.01) |
| *G02B 6/036* | (2006.01) |

(52) U.S. Cl.
CPC ......... *G02B 6/4429* (2013.01); *G02B 6/02395* (2013.01); *G02B 6/03633* (2013.01); *G02B 6/4404* (2013.01); *G02B 6/4436* (2013.01)

(58) Field of Classification Search
CPC . G02B 6/4429; G02B 6/4403; G02B 6/4404
See application file for complete search history.

(56) References Cited

U.S. PATENT DOCUMENTS

| | | | | |
|---|---|---|---|---|
| 4,129,356 | A | * 12/1978 | Oestreich | G02B 6/4402 385/104 |
| 6,504,979 | B1 | 1/2003 | Norris et al. | 385/109 |
| 6,847,768 | B2 | 1/2005 | Lail et al. | 385/111 |
| 6,970,629 | B2 | 11/2005 | Lail et al. | 385/100 |
| 7,590,322 | B2 | 9/2009 | Puzan et al. | 385/109 |
| 8,145,022 | B2 | 3/2012 | Overton et al. | 385/111 |
| 8,195,018 | B2 | 6/2012 | Overton et al. | 385/100 |

(Continued)

FOREIGN PATENT DOCUMENTS

EP    1746447 B1    10/2011    ............... G02B 6/44

OTHER PUBLICATIONS

Patent Cooperation Treaty, International Search Report and Written Opinion for International Application No. PCT/US2014/043632, Mailing Date Oct. 17, 2014—7 pages.
R.H. Norris, H.M. Kemp, & T.G. Goddard, 2007, "The Validity of Emerging Test Techniques for the Evolving Outside Plant Cable Design," *Proceedings of the 56th International Wire & Cable Symposium*, pp. 555-560.

(Continued)

*Primary Examiner* — Omar R Rojas
(74) *Attorney, Agent, or Firm* — William D. Doyle

(57) ABSTRACT

A fiber optic cable includes a jacket forming a cavity therein, a stack of fiber optic ribbons located in the cavity, and a strength member embedded in the jacket. The jacket forms a ridge extending into the cavity lengthwise along the fiber optic cable. The ribbon stack is spiraled through the cavity such that corners of the ribbon stack pass by the ridge at intermittent locations along the length of the cable, where interactions between the ridge and the corners of the ribbon stack facilitate coupling of the ribbon stack to the jacket.

20 Claims, 4 Drawing Sheets

(56) References Cited

U.S. PATENT DOCUMENTS

| | | |
|---|---|---|
| 8,208,773 B2 | 6/2012 | Parris .................... 385/114 |
| 8,229,263 B2 | 7/2012 | Parris et al. ............ 385/114 |
| 2006/0127016 A1 | 6/2006 | Baird et al. ............ 385/113 |
| 2009/0003779 A1 | 1/2009 | Parris .................... 385/103 |
| 2009/0003781 A1 | 1/2009 | Parris et al. ............ 385/113 |
| 2011/0293230 A1 | 12/2011 | Wells et al. ............ 385/113 |
| 2012/0014652 A1 | 1/2012 | Parris .................... 385/111 |

OTHER PUBLICATIONS

K.D. Temple, A. Bringuier, D.A. Seddon, & R.S. Wagman, 2007, "Update: Gel-Free Outside Plant Fiber-Optic Cable Performance Results in Special Testing," *Proceedings of the 56$^{th}$ International Wire & Cable Symposium*, pp. 561-566.

P. Van Pickle, L. Alexander, S. Stokes, 2008, "Central Tube Cable Ribbon Coupling," *Proceedings of the 57$^{th}$ International Wire & Cable Symposium*, pp. 498-503.

\* cited by examiner

COUPLING SYSTEM FOR A FIBER OPTIC CABLE

RELATED APPLICATIONS

This application claims the benefit of priority under 35 U.S.C. §119 of U.S. Provisional Application Ser. No. 61/840,641 filed on Jun. 28, 2013, the content of which is relied upon and incorporated herein by reference in its entirety.

BACKGROUND

Aspects of the present disclosure relate generally to fiber optic cables, and more specifically to frictional coupling of elements to adjoining structure within the cables.

Coupling of elements, such as stacks of ribbons of optical fibers, tight-buffered optical fibers, or loose tubes containing optical fibers, etc., within a fiber optic cable to surrounding or adjoining structure of the cable may reduce axial displacement of the elements and corresponding buckling of optical fibers associated with the elements that may otherwise lead to increased signal attenuation of the optical fibers. For example, if the elements are insufficiently coupled, the elements may become redistributed in a cable when the cable stretches or bends, and as a result the elements may become unevenly packed into a section of the cable. When the cable subsequently straightens or contracts in cooler temperatures or released tension, the elements in the packed section may then buckle or kink, leading to attenuation and/or optical fiber damage.

Foam tape and grease may be used in a fiber optic cable to facilitate coupling between elements, such as stacks of ribbons, and the surrounding structure within the cable. However, the foam may be bulky and may correspondingly increase a cable diameter and associated material costs. Grease can be messy to work with and apply. A need exists for an efficient solution to couple elements within a fiber optic cable to surrounding and/or adjoining structure of the cables, such as the cable jacket, without substantially increasing the cable diameter and/or associated material costs.

SUMMARY

One embodiment relates to a fiber optic cable that includes a jacket forming a cavity therein, a stack of fiber optic ribbons located in the cavity, and a strength member embedded in the jacket. The jacket bulges around the strength member to form a ridge extending into the cavity lengthwise along the fiber optic cable. The ribbon stack is spiraled through the cavity such that corners of the ribbon stack pass by the ridge at intermittent locations along the length of the cable, where interactions between the ridge and the corners of the ribbon stack facilitate coupling of the ribbon stack to the jacket.

Another embodiment relates to a fiber optic cable that includes a jacket forming a cavity therein, a stack of fiber optic ribbons located in the cavity, and first and second strength members embedded in the jacket. The first and second strength members are positioned on opposite sides of the ribbon stack from one another. The jacket bulges around the strength members to form ridges extending into the cavity lengthwise along the jacket. The ridges form the narrowest width of the cavity therebetween. The ribbon stack is spiraled through the cavity such that corners of the ribbon stack pass by the ridges at intermittent locations along the length of the fiber optic cable, where interactions between the ridges and the corners of the ribbon stack facilitate coupling of the ribbon stack to the jacket.

Yet another embodiment relates to a fiber optic cable that includes a jacket forming a cavity therein and a stack of fiber optic ribbons located in the cavity. The jacket includes a ridge extending into the cavity along the length of the jacket. Each ribbon includes a plurality of optical fibers arranged side-by-side with one another and coupled to one another in a common matrix. The ribbon stack is wound such that corners of the ribbon stack pass by the ridge at intermittent locations along the length of the fiber optic cable. The ridge is rigid such that the ribbon stack deforms about the ridge at the intermittent locations, bending optical fibers of at least some of the ribbons, however the optical fibers are bend-insensitive optical fibers, each including a glass core surrounded by a glass cladding. The glass cladding includes annular regions, where a first of the annular regions has a refractive index that is lower than the average refractive index of the core, thereby reflecting errant light back to the core. A second of the annular regions of the cladding has a refractive index that differs from the first of the annular regions, thereby further reflecting or trapping errant light from the core and improving the performance of the optical fiber in terms of reduced attenuation from macro-bending. Interaction between the ridge and the ribbon stack facilitates coupling of the ribbon stack to the jacket.

Still another embodiment relates to a fiber optic cable that includes a jacket forming a cavity therein and a stack of fiber optic ribbons located in the cavity. The jacket includes an indentation on the exterior thereof that forms a ridge extending into the cavity along the length of the jacket. Each ribbon of the stack includes a plurality of optical fibers arranged side-by-side with one another and coupled to one another in a common matrix. Corners of the ribbon stack pass by the ridge of the jacket at intermittent locations along the length of the fiber optic cable, and interaction between the ridge and the ribbon stack facilitates coupling of the ribbon stack to the jacket.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments now described in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
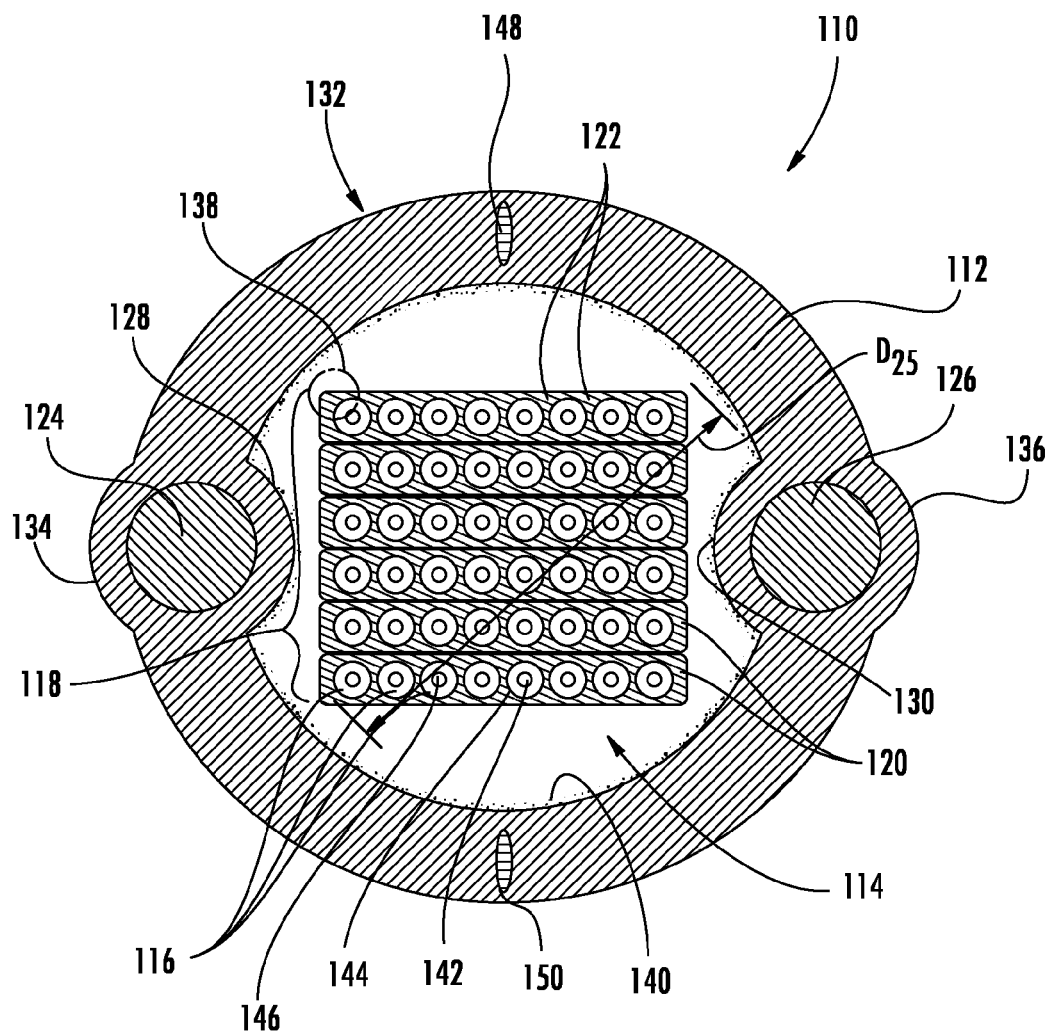
FIG. 1 is a cross-sectional view of a fiber optic cable according to an exemplary embodiment.

Referring to FIG. 1, a fiber optic cable 110, shown in cross-section orthogonal to the length of the cable 110, includes a jacket 112 (e.g., tube, sheath) forming a cavity 114 (e.g., enclosure, passage). Optical fibers 116 are located in the cavity 114; and, more specifically, a stack 118 of fiber optic ribbons 120 of the optical fibers 116 is located in the cavity 114. Each ribbon 120 includes the optical fibers 116 arranged side-by-side with one another and bound in a common matrix 122, such as an ultraviolet-cured acrylate or another resin or other material.

The ribbon stack 118 may be rectangular in cross-section, as shown in FIG. 1, or may be otherwise shaped, such as having sub-sections with ribbons 120 of a particular number of optical fibers 116, where the ribbons 120 of the sub-sections have fewer optical fibers 116 closer to the top and bottom of the ribbon stack 118 (e.g., ziggurat-shaped). The geometry of the ribbon stack 118 may be polygonal in cross-section, and the ribbons 120 may be concentrically aligned with one another in the ribbon stack 118. In other embodiments the optical fibers 116 may be otherwise arranged, such as in buffer tubes, micromodules, or other structures within the jacket 112.

Figure 3:
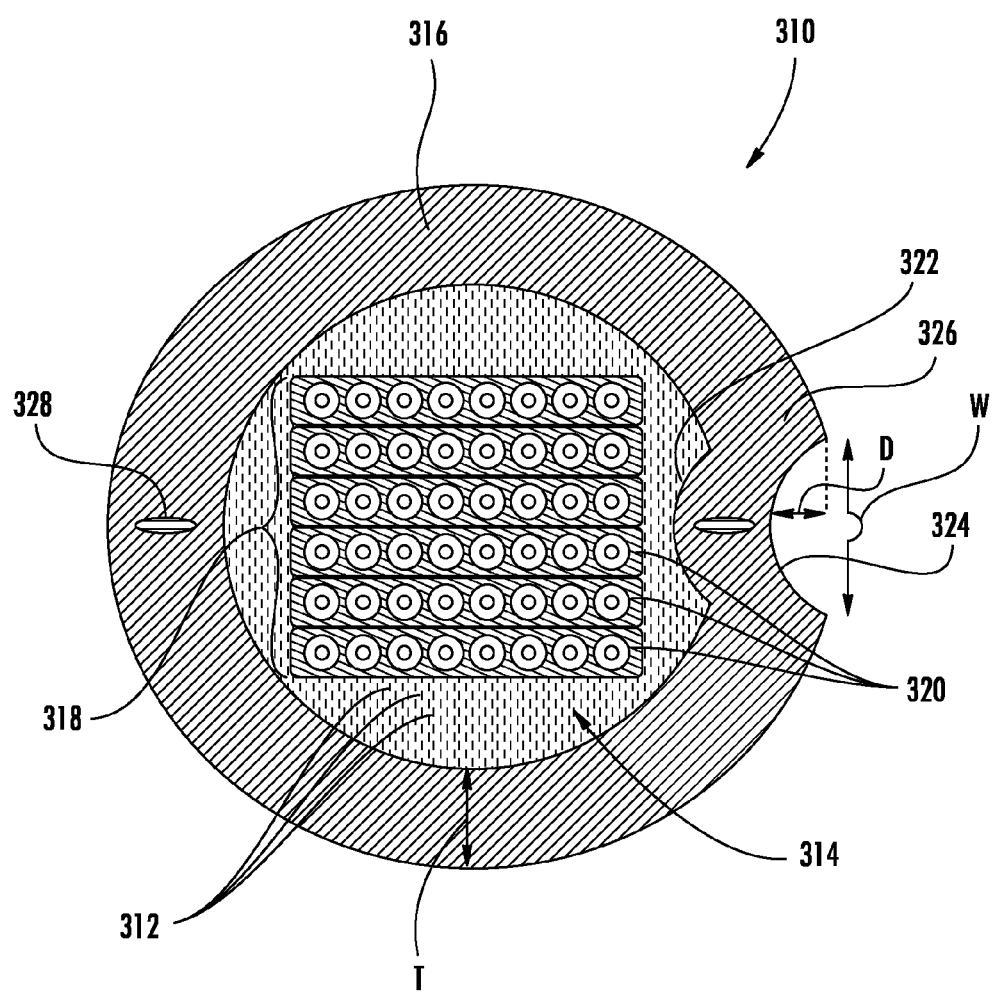
FIG. 3 is a cross-sectional view of a fiber optic cable according to yet another exemplary embodiment.

According to an exemplary embodiment, the fiber optic cable 110 includes one or more strength members embedded in the jacket 112, such as first and second strength members 124, 126 positioned on opposite sides of the ribbon stack 118, as shown in FIG. 1. The strength members 124, 126 may be elongate rods, such as rods of glass-reinforced plastic, steel rods, or other materials. The strength members 124, 126 may provide additional tensile strength to the fiber optic cable 110, reinforcing the ribbon stack 118. Further, the strength members 124, 126 may provide anti-buckling strength to the fiber optic cable 110. In some embodiments, the fiber optic cable 110 may further or alternatively include tensile yarn, such as aramid or fiber glass yarn, positioned in the cavity 114 around the ribbon stack 118 (see, e.g., tensile yarn 312 as shown in FIG. 3).

According to an exemplary embodiment, the jacket 112 of the fiber optic cable 110 bulges about the strength members 124, 126. In some embodiments, the bulge extends into the cavity 114, forming a ridge 128, 130 extending lengthwise along the jacket 112 through the cavity 114. In some embodiments, the exterior 132 of the cable 110 is generally round, but the bulge about the strength member 124, 126 may also form a ridge 134, 136 extending outward from the exterior 132 of the jacket, providing a tactile and visual indicator of interior contents of the cable 110, such as the location of the strength members 124, 126. Locating the strength members 124, 126 may ease connectorization of the cable and/or facilitate tearing open of the cable to access the optical fibers 116. In other embodiments, the exterior 132 of the cable 110 does not include a ridge. For example, the exterior 132 may be completely round or otherwise shaped, such as oblong or rectangular in cross-section. In some embodiments, the ridge 128, 130 may be formed from jacket material, without being a bulge about a strength member 124, 126.

The ridge 128, 130 may extend into cavity 114, relative to the surrounding wall of the jacket 112, such as by a distance of at least 100 micrometers, at least 250 micrometers, and/or at least 500 micrometers. In some such embodiments, or in other embodiments, the ridge 128, 130 may extend no more than 2 millimeters into the cavity, such as no more than 1.5 millimeters. In still other embodiments, the ridge may be greater in length or otherwise sized. According to an exemplary embodiment, the width of the cavity 114 passing from a peak of the ridge 128, 130 through the cross-sectional center of the cavity 114 to the jacket 112 on the opposing side of the cavity 114 is less than the widest cross-sectional dimension $D_{RS}$ of the ribbon stack 118, such as the diagonal cross-section of a rectangular ribbon stack 118. However, other cross-sections of the cavity 114 are wider than the widest cross-sectional dimension $D_{RS}$ of the ribbon stack 118.

Figure 2:
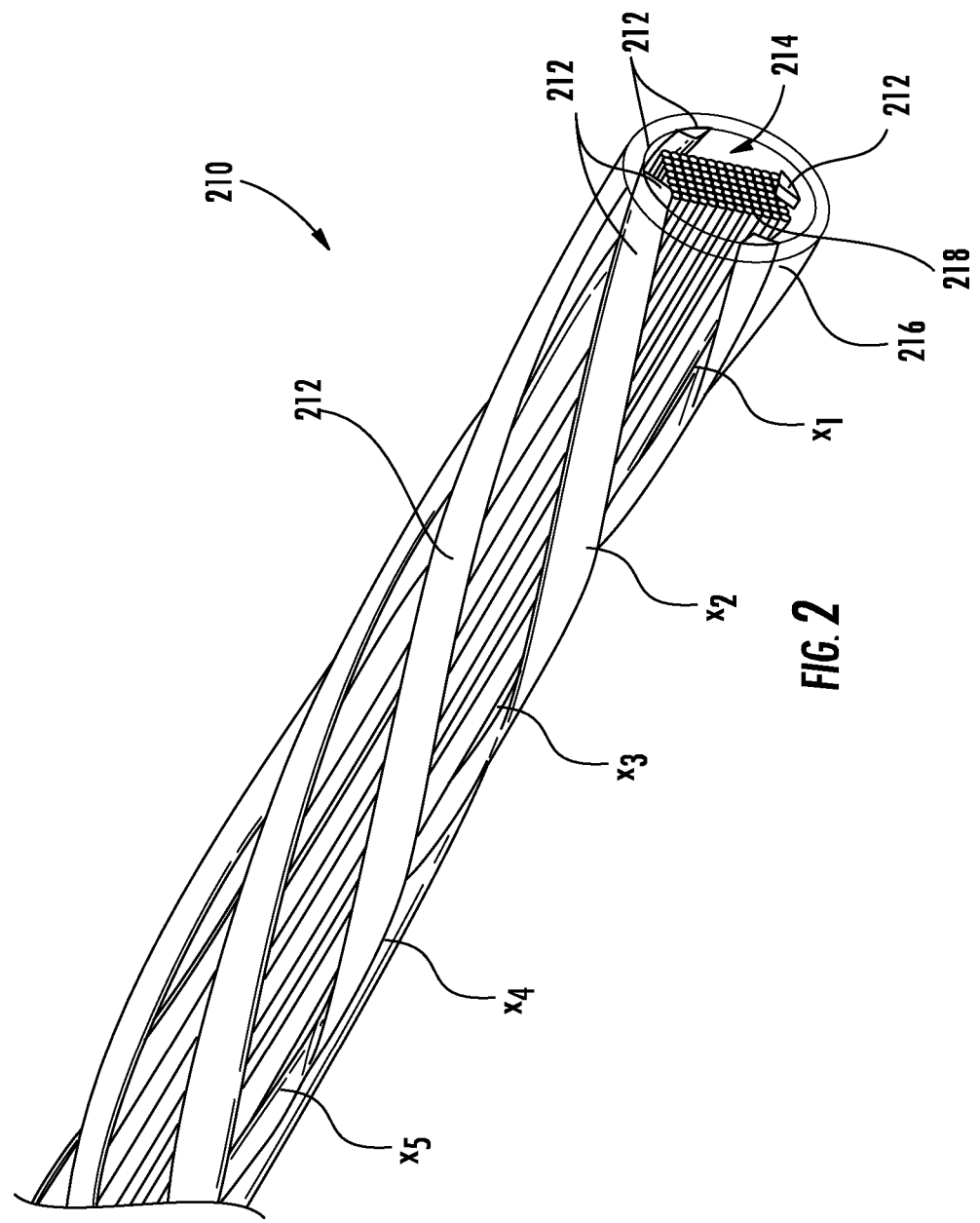
FIG. 2 is a perspective view of a fiber optic cable according to another exemplary embodiment.

According to an exemplary embodiment, the ribbon stack 118 is spiraled through the cavity such that corners 138 of the ribbon stack 118 pass by the ridge 128, 130 at intermittent locations (see, e.g., locations $X_1$, $X_2$, $X_3$, $X_4$, $X_5$ as shown in FIG. 2) along the length of the fiber optic cable 110. In other embodiments, the ridge 128, 130 may be spiraled and the ribbon stack 118 may be straight through the cavity 114 (see, e.g., spiraled ridges 212 as shown in FIG. 2). Both the ribbon stack 118 and the ridge 128, 130 may be spiraled at different rates. Regardless of which component is spiraled, the ridge 128, 130 may directly contact corners 138 of the ribbon stack 118 at the intermittent locations, or may raise other elements in the interior of the cable 110 to contact the ribbon stack 118, such as water-swellable tape, tensile strength members, heat-shielding tape, or other elements positioned between the ribbon stack 118 and the ridge 128, 130. Between the intermittent locations, the ribbon stack 118 may be separated from the jacket 112, as shown in FIG. 1, by at least 20 micrometers on average, such as at least 50 micrometers, and/or such that sections of the ribbon stack between the intermittent locations are substantially less coupled to the jacket than at the intermittent locations.

Direct or indirect interactions between the ridge 128, 130 and corners 138 of the ribbon stack 118, as the ribbon stack 118 rotates relative to the ridge 128, 130 and/or vice versa, facilitates coupling of the ribbon stack 118 to the jacket 112. For example, in some embodiments, coupling of the ribbon stack 118 to the jacket 112 facilitated by the interaction of the corners 138 of the ribbon stack 118 and the ridges 128, 130 is such that a force of at least 0.05 newtons per optical fiber in the ribbon stack for every 30 meters of the cable is required to draw the ribbon stack 118 from an end of the jacket 112 when the cable 110 is at room temperature range of about 23 degrees Centigrade, such as at least 0.1 newtons per optical fiber, at least 0.2 newtons per optical fiber. The force may also or alternatively be no more than 1.2 newtons per optical fiber in the ribbon stack for every 30 meters of the cable 110, such as 1.0 newtons or less per optical fiber, 0.8 newtons or less per optical fiber. In other contemplated embodiments, other coupling forces may be present in the cable 110.

Still referring to FIG. 1, according to an exemplary embodiment, the interior of the cavity 114 is lined with particles of powder 140. In some embodiments, at least some of the particles of powder 140 are partially embedded in the jacket 112 and contribute to the frictional contact at the interfaces between the ribbon stack 118 and the ridge 128, 130. In some embodiments, the powder 140 includes flame-retardant materials such as aluminum trihydrate, aluminum hydroxide, melamine, hexabromocyclododecane, magnesium hydroxide, mica powder, aluminum hydratete, hexabromocyclododecane polycarbonate, brucite powder, ammonium polyphosphate, bromopolystyrene, or other flame-retardant materials. In some embodiments, the powder 140 includes water-swellable materials, such as super-absorbent polymer, cross-linked sodium polyacrylate, copolymer of acrylate and polyacrylamide, and other water-swellable materials. In still other embodiments, the powder 140 may include more or other components. In contemplated embodiments, such powder 140 may additionally or alternatively be carried or integrated with a tape, such as a non-woven sheet of polymeric material, and/or a yarn, such as a bundle of aramid fibers or other yarns.

According to an exemplary embodiment, the average volume-based particle size of the powder 140 is 200 micrometers or less, where volume-based particle size equals the diameter of a sphere having the equivalent volume of a given particle, such as 150 micrometers or less. Smaller particles of powder 140 mitigate micro-bending attenuation of the optical fibers 116, should the optical fibers 116 and/or ribbons 120 contact and impinge upon the particles.

In some embodiments, each optical fiber 116 includes a glass core 142 surrounded by a glass cladding 144, where the glass cladding 144 of the optical fibers 116 is surrounded by a coating 146 including interior and exterior polymer layers. The interior polymer layer of the coating 146 has a lower modulus of elasticity than the exterior polymer layer of the coating 146, such that the coating includes a hard shell exterior layer and a stress-isolation layer interior thereto. In some such embodiments, the exterior layer has a modulus of elasticity that is at least twice that of the interior layer, such as at least three- or even four-times that of the inner layer.

If particles of the powder 140, extending into the cavity 114 from the interior of the jacket 112, contact the fiber optic ribbons 120, then the exterior polymer layer of the coating 146 limits scratching and wear of the glass cladding 144 of the optical fiber 116. Further, if particles of the powder 140 contact the fiber optic ribbons 120, the interior polymer layer of the coating 146 mitigates transmission of stresses to the glass cladding 144 and glass core 142, thereby limiting associated attenuation from micro-bending. In some embodiments, one or both of the polymer layers are integrated with the matrix 122 of the ribbons, instead of or in addition to being annularly around individual optical fibers 116.

Due at least in part to synergistic use of the strength members 126 and/or the jacket 112 itself to facilitate coupling of the ribbon stack 118 to the jacket 122, in addition to providing reinforcement strength and/or environmental isolation to the optical components of the fiber optic cable 110, the cable 110 may be particularly small. For example, in some embodiments, the cable 110 is generally round in cross-section; and, while supporting the stack of fiber optic ribbons 118, has an average outside diameter of less than 7 millimeters, such as 6.5 millimeters or less, or even 6 millimeters or less. In some such embodiments, the ribbon stack 118 includes at least four ribbons, and the ribbons may each include at least four optical fibers, such as the cable 110 including at least six ribbons of eight-fibers each with a diameter of less than 7 millimeters.

In at least some embodiments, the cable includes two strength members 128, 130 that are between 0.5 and 1.5 millimeters in diameter, the jacket wall (aside from the bulge) has a thickness between 0.75 and 1.75 millimeters, the ridges 128, 130 extend into the cavity 114 by at least 0.15 millimeters and less than 0.5 millimeters, the ribbon stack 118 is rectangular and has a diagonal of between 2.0 and 3.75 millimeters, the inner diameter of the jacket 112 (aside from between the ridges 128, 130) is between 2.5 and 4.5 millimeters and the overall outside diameter of the jacket 112 (aside from external ridges 134, 136, if present) is about 8 millimeters or less, such as 7.5 millimeters or less, such as 7.0 millimeters or less.

According to an exemplary embodiment, the strength member 124, 126 underlying the ridge 128, 130 provides rigidity to the ridge 128, 130 such that the ribbon stack 118 deforms about the ridge 128, 130 at the intermittent locations, bending optical fibers 116 of at least some of the ribbons 120. The optical fibers 116 are compressed and/or tensioned in bending; and in some embodiments bend-insensitive optical fibers are used to mitigate associated attenuation. For example, in some embodiments, the bend-insensitive optical fibers each include annular regions or layers in the glass cladding 144. A first of the annular regions of the cladding 144, such as an innermost region contacting the core 142, has a refractive index that is lower than the average refractive index of the core 142, thereby reflecting errant light back to the core 142. A second of the annular regions of the cladding 144, such as a region adjoining the outside of the first annular region of the cladding 144, has a refractive index that differs from the first of the annular regions of the cladding 144 (e.g., the second annular region of the cladding 144 may be up-doped or down-doped), thereby further reflecting or trapping errant light from the core 142 and improving the performance of the optical fiber 116 in terms of reducing attenuation from macro-bending.

With some such bend-insensitive optical fibers 116 or other optical fibers, the degree of bend insensitivity of the optical fibers 116 is such that with one turn around a 10 millimeter diameter mandrel, each optical fiber exhibits an attenuation increase of less than 0.5 decibels, such as 0.3 decibels, or even 0.25 decibels, at a wavelength of 850 nanometers; with one turn around a 15 millimeter diameter mandrel, each optical fiber exhibits an attenuation increase of less than 0.2 decibels, such as 0.15 decibels, or even 0.1 decibels, at a wavelength of 850 nanometers; and with one turn around a 20 millimeter diameter mandrel, each optical fiber exhibits an attenuation increase of less than 0.1 decibels, such as 0.8 decibels, or even 0.6 decibels, at a wavelength of 850 nanometers, thereby mitigating bending attenuation due to interactions of the optical fibers 116 of the ribbon stack 118 with the ridge 128, 130.

Still referring to FIG. 1, in some embodiments the cable 110 includes a discontinuity of material 148, 150 in the jacket 112 that extends lengthwise along the jacket 112. For example, the jacket 112 may be formed from a first material and the discontinuity 148, 150 may be formed from a second material. The first material may include a first polymer, such as primarily consisting of the first polymer (e.g., consisting at least 51%, such as at least 60% by volume thereof). The second material may include a second polymer, such as primarily consisting of the second polymer (e.g., consisting at least 51%, such as at least 60% by volume thereof).

In some embodiments, the second material may also include a relatively small amount of the first polymer to increase adhesion between the first and second materials such that the jacket 112 with the discontinuity 148, 150 forms a cohesive body. In some embodiments, the first polymer is polyethylene, polyvinyl chloride, or another material. In some embodiments, the second polymer is polypropylene, or another material. Either or both of the first and second materials may include flame-retardant additives or materials. According to an exemplary embodiment, the discontinuity 148, 150 facilitates tearing open of the jacket 112 about the discontinuity 148, 150 by providing a tear path therethrough and/or thereabout.

In some embodiments the cable 110 includes at least two discontinuities 148, 150. The discontinuities 148, 150 may be positioned on opposite sides of the ribbon stack 118 from one another such that the discontinuities 148, 150 facilitate tearing the jacket 112 in two to access the ribbon stack 118. As shown in FIG. 1, the discontinuities 148, 150 may be located in sections of the jacket 112 between the strength members 124, 126 (e.g., equidistant therefrom) such that pulling apart the strength members 124, 126 facilitates tearing open the jacket 112 via the discontinuities 148, 150. In other embodiments, other access features may be used, such as V-grooves to facilitate tearing of the jacket 112.

Referring now to FIG. 2, a cable 210, similar to the cable 110, includes ridges 212 that spiral lengthwise through a cavity 214 along the interior surface of a jacket 216, which is shown as transparent in FIG. 2 to show interactions between the ridges 212 and a ribbon stack 218. The ribbon stack 218, or other optical elements, may be laid straight through the cavity 214, without stranding, and coupling may be achieved by interaction with the corners of the ribbon stack 218 and the ridges 212 at intermittent locations $X_1$, $X_2$, $X_3$, $X_4$, $X_5$ as the ridges 212 pass over the corners of the ribbon stack 218. As such, the features and attributes described above with regard to the cable 110 may be achieved with a configuration as shown in FIG. 2, where the ridges 212 spiral instead of the ribbon stack 218, given the above described relationships between the ribbon stack and ridge(s). In such an embodiment, the ridges 212 may be formed by jacket material that is not raised or supported by a strength member. Tensile yarn may be positioned in the cavity 214 of the cable 210, between the ribbon stack 218 and the interior of the jacket 216.

With either the cable 110 or the cable 210, or other cables disclosed herein, the distance between intermittent locations $X_1$, $X_2$, $X_3$, $X_4$, $X_5$ of coupling depends upon the rate at which the stack 218 and/or ridges 212 spiral relative to the other. Accordingly, a shorter lay length for the ribbon stack 218 may increase coupling of the ribbon stack 218 to the jacket 216 by providing more intermittent locations $X_1$, $X_2$, $X_3$, $X_4$, $X_5$ for a given length of the jacket 216. Also, increasing the number of ridges 212 (FIG. 2 shows four) may correspondingly multiple the number of intermittent locations $X_1$, $X_2$, $X_3$, $X_4$, $X_5$ for a given length of the jacket 216.

For example, in some embodiments, the cable 210, or any of the other cables disclosed herein, includes at least 5 intermittent locations $X_1$, $X_2$, $X_3$, $X_4$, $X_5$ at which corners of the ribbon stack 218 interface with an internal ridge 212 for every meter length of the jacket 216, such as at least 8 such intermittent locations $X_1$, $X_2$, $X_3$, $X_4$, $X_5$ per meter, which may provide for a sufficient degree of coupling to overcome optical elements from shifting as discussed in the Background section. In some such embodiments or other embodiments, there are not more than 80 intermittent locations $X_1$, $X_2$, $X_3$, $X_4$, $X_5$ at which corners of the ribbon stack 218 interface with an internal ridge 212 for every meter length of the jacket 216, such as not more than 45 such intermittent locations $X_1$, $X_2$, $X_3$, $X_4$, $X_5$ per meter, which may allow for independent flexing and movement of sections of the ribbon stack 218 between the intermittent locations $X_1$, $X_2$, $X_3$, $X_4$, $X_5$ to low-stress positions as the cable bends.

Referring now to FIG. 3, a fiber optic cable 310 includes a jacket 316 forming a cavity 314 therein and a stack 318 of fiber optic ribbons 320 located in the cavity 314. The jacket 316 includes a ridge 322 extending into the cavity 314 along the length of the jacket 316. The cable 310 may include embedded strength members (see, e.g., strength members 124, 126 as shown in FIG. 1), the tensile yarns 312, water-swellable tape, and/or other features disclosed herein with regard to the cables 110, 210.

The ridge 322 of the cable 310 in FIG. 3 is formed from a continuous, lengthwise indentation 324 or fold of the jacket 316. The indentation 324 may be formed by wheels or other element positioned along the manufacturing line of the cable 310, following the extrusion cross-head; and may be formed while the jacket 316 has not fully cooled. The wheels or other elements forming the indentation 324 may be controlled to apply consistent displacement of the jacket 316, so as to form a consistently deep indentation 324; or may be controlled to apply a consistent force to the jacket 316, such that the depth of the indentation 324 may vary, depending upon whether or not the ridge 322 is contacting corners of the ribbon stack 318 for example. In some embodiments, the wheels or other elements spiral around the jacket 316 as the jacket 316 is manufactured, forming a spiraling ridge or ridges 322, similar to the ridges 212 of the cable 210. In other embodiments, the ridge 322 is straight along the length of the jacket 316, and the ribbon stack 318 is spiraled. Spiraling the ribbon stack 318, 118 may reduce bending attenuation.

In some embodiments, two or more lengthwise indentations 324 are formed in the jacket 316, such as being positioned on opposite sides of the jacket 316 to provide coupling, similar to the ridges 128, 130 of the cable 110.

In some embodiments, the ridge 322 is rigid such that the ribbon stack 318 deforms about the ridge 322 at the intermittent locations, bending optical fibers of at least some of the ribbons 320; and, in some such embodiments, the optical fibers are bend-insensitive optical fibers. Interaction, direct or indirect by way of an intermediate element, between the ridge 322 and the ribbon stack 318 facilitates coupling of the ribbon stack 318 to the jacket 316.

In some embodiments, the indentation 324 and ridge 322 formed therefrom are intermittently pressed into the cable 310, to form discrete ridges 322 and indentations 324 along the length of the cable 310 (see generally the intermittent locations $X_1$, $X_2$, $X_3$, $X_4$, $X_5$ spaced apart along the length of the cable 210). Discretizing the ridge 322 reduces the degree of coupling, and spacing of the discrete ridges 322 may be used to achieve a desired degree of coupling. In some embodiments, discrete indentations 324 and ridges 322 are each at least a centimeter in length, and no more than a meter in length. The discrete indentations and ridges are spaced apart from one another by at least a centimeter, such as at least a decimeter.

According to an exemplary embodiment, the indentation 324 is shaped to mitigate the impact of the indentation 324 on bending of the fiber optic cable 310, such that the cable 310 does not have a substantial bend preference induced by the indentation 324. In some embodiments, the indentation 324 is relatively shallow, having a maximum depth D relative to the adjoining exterior of the cable 310 that is at least 100 micrometers and/or no more than 2 millimeters. In other embodiments, the depth D may be otherwise dimensioned. Further, in some embodiments, the indentation 324 is relatively narrow, having a width W, from edge to edge on the exterior of the jacket 316 that is less than 3 millimeters, such as 2 millimeters or less. In some embodiments, the cross-sectional periphery of the exterior of the jacket 316 is round, and each indentation 324 falls within an arc length of less than 45 degrees of the perimeter, such as less than 30 degrees of the perimeter.

According to an exemplary embodiment, forming the indentation 324 does not substantially change the thickness T of the jacket 316 defining the indentation 324 and ridge 322 such that the thickness T is within at least 25% of the average thickness of the jacket 316, such as within 15%, within 10%, which may be achieved by manufacturing the indentation after the jacket 316 has partially solidified after extrusion, such as when the average temperature of the jacket 316 is at least 5 degrees Centigrade cooler than the temperature at the cross-head, such as at least 10 degrees cooler, at least 20 degrees cooler; and/or but no more than 100 degrees Centigrade cooler. According to an exemplary embodiment, the ridge 322 of the cable 310 may have the geometry and/or dimensions described above for the ridges of the cables 110, 210.

Similar to the exterior ridge 134, 136 of the cable 110, the indentation 324 of the cable 310 provides a point of orientation for the cable 310. As such the indentation 324 may be used in conjunction with access features, such as the material discontinuities 326, 328, that may be consistently positioned in a known location within the jacket relative to the indentation 324. For example, in some embodiments material discontinuities 326, 328 are positioned in the indentation 324 and in the jacket 316 on the opposite side of the ribbon stack 318 from the indentation 324. So positioned, a user may peel the jacket 316 apart using the indentation 324 as a notch in which to insert finger nails, a key, a screwdriver, or other items.

Figure 4:
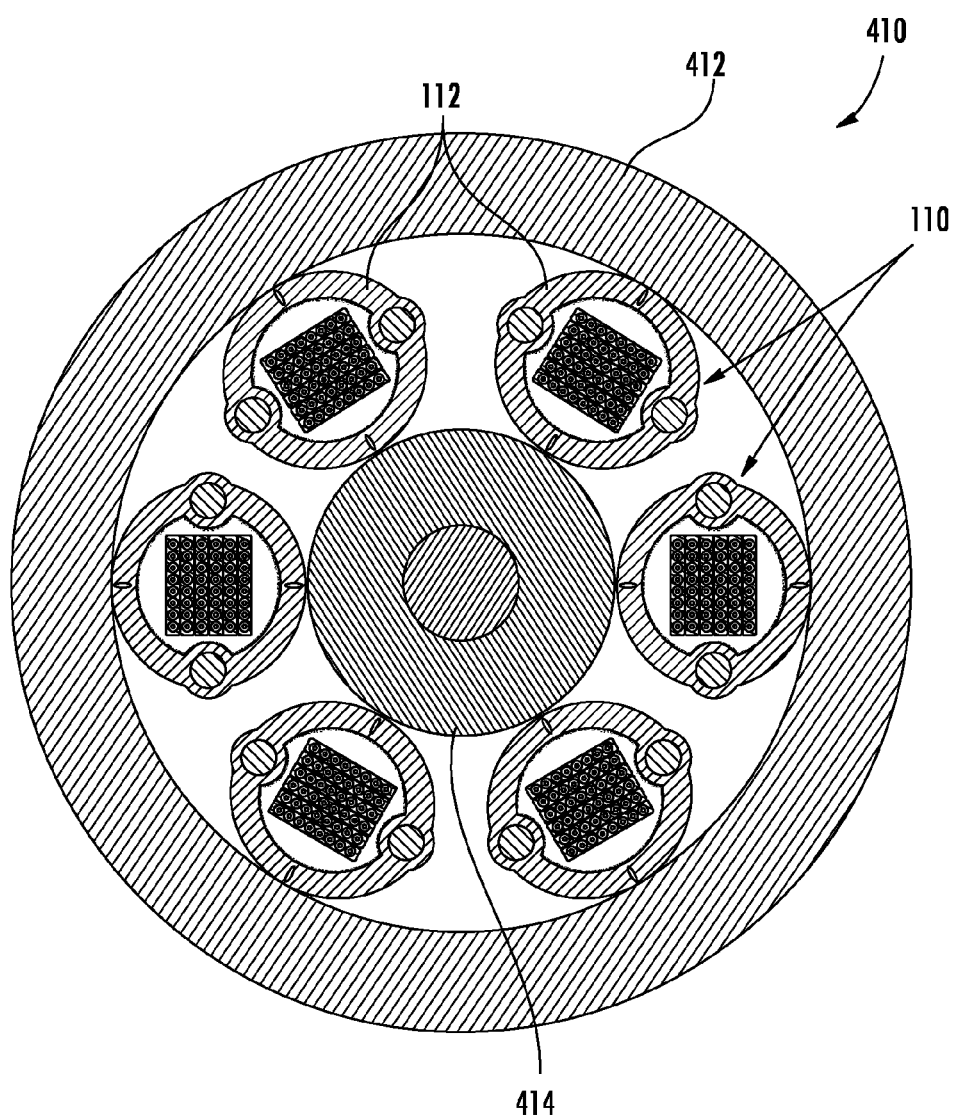
FIG. 4 is a cross-sectional view of a fiber optic cable supporting a plurality of fiber optic cables of FIG. 1 therein, according to an exemplary embodiment.

Referring now to FIGS. 1 and 4, the jacket of cables disclosed herein may be the outermost jacket of the respective fiber optic cable, defining the exterior of the cable. In other embodiments, additional manufacturing steps may include extruding a second jacket 412 around the jacket 112, stranding the fiber optic cable 110 with other such fiber optic cables 110 in a larger assembly, surrounding the fiber optic cable 110 with metallic armor and then extruding polymer over the armor, and/or additional manufacturing steps may be used to make other configurations using technology disclosed herein.

FIG. 4 shows a cable 410 (e.g., distribution cable) supporting a plurality of smaller fiber optic cables 110, each similar to the cable 110 of FIG. 1. The fiber optic cables 110 are stranded around a central strength member 414 and located within the main jacket 414 for the cable 410. In some embodiments, the main jacket 414 for the cable 410 is polymeric, such as including extruded polyethylene. In some such embodiments, the main jacket 414 is a composite and includes an interior layer of armor, such as a corrugated steel or copper tubing, surrounding and protecting the smaller optical fiber cables 110 within the cable 410.

The construction and arrangements of the fiber optic cable, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
   a jacket forming a cavity therein;
   a stack of fiber optic ribbons located in the cavity, each ribbon comprising a plurality of optical fibers arranged side-by-side with one another and coupled to one another in a common matrix; and
   a strength member embedded in the jacket,
   wherein the jacket bulges around the strength member to form a ridge extending into the cavity lengthwise along jacket wherein the ribbon stack is spiraled through the cavity such that corners of the ribbon stack pass by the ridge at intermittent locations along the length of the jacket, and wherein interactions between the ridge and the corners of the ribbon stack facilitate coupling of the ribbon stack to the jacket.

2. The fiber optic cable of claim 1, wherein the width of the cavity passing from a peak of the ridge through the center of the cavity to the jacket on the opposing side of the cavity is less than the widest cross-sectional dimension of the ribbon stack.

3. The fiber optic cable of either claim 1, wherein the ribbon stack directly contacts the ridge at the intermittent locations, providing a frictional contact between the ribbon stack and the ridge at the interface thereof.

4. The fiber optic cable of claim 3, wherein the interior of the cavity is lined with particles of powder, wherein at least some of the particles are partially embedded in the jacket and contribute to the frictional contact at the interface between the ribbon stack and the ridge.

5. The fiber optic cable of claim 4, wherein the powder comprises flame-retardant materials.

6. The fiber optic cable of claim 4, wherein each optical fiber comprises a glass core surrounded by a glass cladding, wherein the glass cladding of the optical fibers is surrounded by interior and exterior polymer layers, wherein the interior polymer layer has a lower modulus of elasticity than the exterior polymer layer, whereby if powder particles extending inward from the interior of the jacket contact the fiber optic ribbons, the exterior polymer layer limits scratching and wear of the glass cladding of the optical fiber and the interior polymer layer mitigates transmission of stresses to the glass, thereby limiting associated attenuation from micro-bending.

7. The fiber optic cable claim 1, wherein the strength member underlying the ridge provides rigidity to the ridge such that the ribbon stack deforms about the ridge at the intermittent locations, bending optical fibers of at least some of the ribbons.

8. The fiber optic cable of claim 7, wherein the optical fibers of the fiber optic ribbons are bend-insensitive optical fibers, each comprising a glass core surrounded by a glass cladding, wherein the glass cladding comprises annular regions, wherein a first of the annular regions has a refractive index that is lower than the average refractive index of the core, thereby reflecting errant light back to the core, and wherein a second of the annular regions of the cladding has a refractive index that differs from the first of the annular regions, thereby further reflecting or trapping errant light from the core and improving the performance of the optical fiber in terms of reduced attenuation from macro-bending.

9. A fiber optic cable, comprising:
a jacket forming a cavity therein;
a stack of fiber optic ribbons located in the cavity;
a first strength member embedded in the jacket; and
a second strength member embedded in the jacket, wherein the first and second strength members are positioned on opposite sides of the ribbon stack from one another;
wherein the jacket bulges around the strength members to form ridges extending into the cavity lengthwise along the jacket, wherein the ridges form the narrowest width of the cavity therebetween, wherein the ribbon stack is spiraled through the cavity such that corners of the ribbon stack pass by the ridges at intermittent locations along the length of the jacket, and wherein interactions between the ridges and the corners of the ribbon stack facilitate coupling of the ribbon stack to the jacket.

10. The fiber optic cable of claim 9, wherein the exterior periphery of the jacket is generally round in cross-section, and wherein, due at least in part to synergistic use of the strength members to facilitate coupling of the ribbon stack to the jacket in addition to providing reinforcement strength to the fiber optic cable, the jacket is particularly small, supporting the stack of fiber optic ribbons while having an average outside diameter of less than 7 millimeters, and wherein the stack of fiber optic ribbons comprises at least 48 optical fibers.

11. The fiber optic cable of either claim 9, further comprising a discontinuity of material in the jacket that extends lengthwise along the jacket, wherein the discontinuity facilitates tearing open of the jacket about the discontinuity.

12. The fiber optic cable of claim 11, further comprising another discontinuity, wherein the discontinuities are on opposite sides of the ribbon stack from one another such that the discontinuities facilitate tearing the jacket in two to access the ribbon stack.

13. The fiber optic cable of claim 12, wherein the discontinuities are located between the strength members such that pulling apart the strength members facilitates tearing open the jacket via the discontinuities.

14. The fiber optic cable of claim 9, wherein the jacket bulges around the strength members to form outer ridges protruding from the exterior of the jacket, which provide tactile and visual indications of the location of the strength members.

15. A fiber optic cable, comprising:
a jacket forming a cavity therein, the jacket comprising a ridge extending into the cavity along the length of the jacket; and
a stack of fiber optic ribbons located in the cavity, each ribbon comprising a plurality of optical fibers arranged side-by-side with one another and coupled to one another in a common matrix, wherein the optical fibers are bend-insensitive optical fibers, each comprising a glass core surrounded by a glass cladding, wherein the glass cladding comprises annular regions, wherein a first of the annular regions has a refractive index that is lower than the average refractive index of the core, thereby reflecting errant light back to the core, and wherein a second of the annular regions of the cladding has a refractive index that differs from the first of the annular regions, thereby further reflecting or trapping errant light from the core and improving the performance of the optical fiber in terms of reduced attenuation from bending;
wherein corners of the ribbon stack pass by the ridge at intermittent locations along the length of the jacket, wherein the ridge is rigid such that the ribbon stack deforms about the ridge at the intermittent locations, bending optical fibers of at least some of the ribbons, and wherein interaction between the ridge and the ribbon stack facilitates coupling of the ribbon stack to the jacket.

16. The fiber optic cable of claim 15, wherein the cavity is generally round in cross-section, wherein an average inner diameter of the jacket is greater than the widest cross-sectional dimension of the ribbon stack and wherein the diameter of the cavity passing from a peak of the ridge through the center of the cavity to the jacket on the opposing side of the cavity is less than the widest cross-sectional dimension of the ribbon stack.

17. The fiber optic cable of either claim 15, further comprising a strength member underlying the ridge and augmenting rigidity of the ridge, wherein the exterior cross-section of the jacket is generally round, and wherein, due at least in part to synergistic use of the strength member to facilitate coupling of the ribbon stack to the jacket in addition to providing reinforcement strength to the fiber optic cable, the jacket is particularly small, supporting the stack of fiber optic ribbons while having an average outside diameter of less than 7 millimeters and wherein the stack of fiber optic ribbons comprises at least 48 optical fibers.

18. The fiber optic cable of claim 15, wherein the degree of bend insensitivity of the optical fibers is such that with one turn around a 10 millimeter diameter mandrel, each optical fiber exhibits an attenuation increase of less than 0.5 decibels at a wavelength of 850 nanometers; with one turn around a 15 millimeter diameter mandrel, each optical fiber exhibits an attenuation increase of less than 0.2 decibels at a wavelength of 850 nanometers; and with one turn around a 20 millimeter diameter mandrel, each optical fiber exhibits an attenuation increase of less than 0.1 decibels at a wavelength of 850 nanometers.

19. The fiber optic cable of claim 15, wherein the ridge spirals through the length of the cavity around the interior surface of the jacket.

20. The fiber optic cable of claim 15, wherein the coupling of the ribbon stack to the jacket is such that a force of at least 0.05 newtons per optical fiber in the ribbon stack for every 30 meters of the jacket, but no more than 1 newton per optical fiber in the ribbon stack for every 30 meters of the jacket, is required to draw the ribbon stack from an end of the jacket.

* * * * *